United States Patent
Kim et al.

(10) Patent No.: US 10,612,604 B2
(45) Date of Patent: Apr. 7, 2020

(54) SYSTEM AND METHOD FOR CONTROLLING ENGINE CLUTCH SLIP FOR A HYBRID VEHICLE

(71) Applicants: HYUNDAI MOTOR COMPANY, Seoul (KR); KIA MOTORS CORPORATION, Seoul (KR)

(72) Inventors: Young Chul Kim, Gwangmyeong-si (KR); Sang Hyun Jeong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 317 days.

(21) Appl. No.: 15/818,976

(22) Filed: Nov. 21, 2017

(65) Prior Publication Data
US 2019/0078627 A1 Mar. 14, 2019

(30) Foreign Application Priority Data

Sep. 14, 2017 (KR) .................. 10-2017-0117527

(51) Int. Cl.
*B60L 9/00* (2019.01)
*F16D 48/02* (2006.01)
(Continued)

(52) U.S. Cl.
CPC .............. *F16D 25/14* (2013.01); *B60K 6/387* (2013.01); *B60W 20/00* (2013.01); *F16D 48/02* (2013.01);
(Continued)

(58) Field of Classification Search
CPC .......... F16D 25/14; F16D 25/10; F16D 48/02; F16D 48/066; F16D 25/12; F16D 2500/502; F16D 2300/06; F16D 2500/30406; F16D 2500/30806; F16D 2500/10412; F16D 2048/0221; Y10S 903/914; B60Q 9/00; B60W 30/186; B60W 20/40; B60W 20/15; B60W 2050/004; B60W 2710/025; B60W 10/023; B60W 20/00; B60W 2510/0241; B60W 2710/021; B60W 2510/1005; B60K 6/48; B60K 6/387; B60K 6/442; B60K 2006/4825
USPC .................. 701/14, 22; 417/2; 184/6.12; 180/65.25, 65.22; 192/85.63; 477/5; 903/902
See application file for complete search history.

(56) References Cited

U.S. PATENT DOCUMENTS

| | | | |
|---|---|---|---|
| 2009/0234524 A1* | 9/2009 | Kim | B60K 6/48 701/22 |
| 2009/0247355 A1* | 10/2009 | Tryon | F16H 61/0031 477/52 |
| 2010/0018808 A1* | 1/2010 | Gloge | F16H 61/0031 184/6.12 |
| 2011/0313602 A1* | 12/2011 | Hirata | B60K 6/365 701/22 |

(Continued)

Primary Examiner — Shardul D Patel
(74) Attorney, Agent, or Firm — Lempia Summerfield Katz LLC

(57) ABSTRACT

A system and method for controlling engine clutch slip for a hybrid vehicle, in which it is determined whether an engine clutch has entered a slip mode and lubrication of the engine clutch is easily achieved through an additional lubrication hydraulic pressure circuit whenever the engine clutch enters the slip mode, thereby achieving the engine clutch slip control in all shift ranges including low-speed and medium-speed ranges and maintaining the heat energy that is generated from the engine clutch at a predetermined level or lower.

13 Claims, 5 Drawing Sheets

(51) Int. Cl.
    *F16D 48/06*     (2006.01)
    *B60W 20/00*     (2016.01)
    *B60K 6/387*     (2007.10)
    *B60Q 9/00*     (2006.01)
    *F16D 25/12*     (2006.01)

(52) U.S. Cl.
    CPC .............. *F16D 48/066* (2013.01); *B60Q 9/00* (2013.01); *B60W 2510/0241* (2013.01); *B60W 2510/1005* (2013.01); *B60W 2710/021* (2013.01); *F16D 25/12* (2013.01); *F16D 2048/0221* (2013.01); *F16D 2300/06* (2013.01); *F16D 2500/10412* (2013.01); *F16D 2500/30406* (2013.01); *F16D 2500/30806* (2013.01); *F16D 2500/502* (2013.01); *Y10S 903/914* (2013.01)

(56) References Cited

U.S. PATENT DOCUMENTS

| | | | |
|---|---|---|---|
| 2011/0320076 A1* | 12/2011 | Shin | B60K 6/48 701/22 |
| 2013/0324361 A1* | 12/2013 | Kamiyama | B60W 20/10 477/5 |
| 2014/0083811 A1* | 3/2014 | Ito | F16D 25/14 192/85.63 |
| 2015/0001919 A1* | 1/2015 | Murayama | B60T 8/441 303/14 |
| 2015/0183415 A1* | 7/2015 | Moon | B60W 10/02 701/22 |
| 2015/0239452 A1* | 8/2015 | Iwasa | B60K 6/48 701/22 |
| 2017/0259824 A1* | 9/2017 | Kim | B60W 30/18009 |

\* cited by examiner

Prior Art

Prior Art

SYSTEM AND METHOD FOR CONTROLLING ENGINE CLUTCH SLIP FOR A HYBRID VEHICLE

CROSS-REFERENCE TO RELATED APPLICATION

This application claims under 35 U.S.C. § 119(a) the benefit of priority to Korean Patent Application No. 10-2017-0117527 filed on Sep. 14, 2017, the entire contents of which are incorporated herein by reference.

BACKGROUND

(a) Technical Field

The present disclosure relates to a system and method for controlling engine clutch slip for a hybrid vehicle, and more particularly, to a system and method for controlling engine clutch slip for a hybrid vehicle, in which it is determined whether an engine clutch has entered a slip mode and then lubrication of the engine clutch is easily achieved through an additional lubrication hydraulic pressure circuit when the engine clutch enters the slip mode.

(b) Background Art

Among environmentally friendly vehicles, hybrid vehicles employ a motor as well as an engine as power sources to reduce emissions and to improve fuel efficiency. Hybrid vehicles have a power transmission system that separately transmits power of the engine or the motor to drive wheels, or transmits power of both the engine and the motor to the drive wheels.

A power transmission system for hybrid vehicles, as shown in FIG. 1, includes an engine 10 and a motor 12 disposed in series, an engine clutch 13 disposed between the engine 10 and the motor 12 to transmit or interrupt power of the engine 10, and an automatic transmission 14 configured to shift and transmit power of the motor 12 or both power of the motor 12 and power of the engine 10 to drive wheels. The power transmission system also includes a hybrid starter generator (HSG) 16, which is a type of motor connected to a crank pulley of the engine 10 so as to generate electricity to start the engine 10 and recharge a battery. The power transmission system further includes an inverter 18 configured to control the motor 12 and to control electricity generation. The power transmission system also includes a rechargeable high-voltage battery 20 connected to the inverter 18 so as to supply electricity to the motor 12.

The driving modes of the hybrid vehicles include an electric-vehicle (EV) mode, which is a pure electric vehicle mode using only the motor power, and a hybrid-electric-vehicle (HEV) mode, which uses the motor power as supplementary power while using the engine (for example, a fossil fuel combustion engine) power as the main power.

In the HEV mode, the vehicle is driven by the sum of output torques of the engine and the motor simultaneously with engagement (lock-up) of the engine clutch 13. In the EV mode, the vehicle is driven only by the output torque of the motor simultaneously with release (open) of the engine clutch 13.

The engine speed (revolutions per minute or rpm) and the motor speed (rpm) are synchronized just before the engine clutch is locked. Even so, if there is a difference in gradient between the engine speed and the motor speed, a difference in inertial force between the engine and a rotor of the motor is created, which may increase impacts in the lock-up of the engine clutch. In order to solve this problem, engine clutch slip control is performed to maintain synchronization and gradient between the engine speed and the motor speed constant.

In the control of the engine clutch slip, when the engine clutch 13 is not completely engaged by hydraulic pressure, heat energy that is generated from the engine clutch increases. This increase is due to a difference between the engine speed and the motor speed, which may lead to deterioration in durability or burning of the engine clutch.

Therefore, in the control of the engine clutch slip, the engine clutch is lubricated in order to maintain the heat energy that is generated from the engine clutch at a predetermined level or lower.

However, in the prior art, because the engine clutch is lubricated only in some ranges (for example, a D1 range) among all shift ranges, there is a limitation in performing engine clutch slip control in the low-speed and medium-speed ranges, in which lubrication is not conducted. Thus, design freedom for improved drivability in the low-speed and medium-speed ranges is limited. There is also a difficulty in securing a margin for improving drivability during acceleration or deceleration of a vehicle.

The above information disclosed in this Background section is only for enhancing the understanding of the background of the disclosure. Therefore, the Background section may contain information that does not form the prior art that is already known in this country to a person of ordinary skill in the art.

SUMMARY OF THE DISCLOSURE

The present disclosure is made in an effort to solve the above-described problems associated with the prior art. I It is an object of the present disclosure to provide a system and method for controlling engine clutch slip for a hybrid vehicle, in which it is determined whether an engine clutch has entered a slip mode. Lubrication of the engine clutch is easily achieved through an additional lubrication hydraulic pressure circuit whenever the engine clutch enters the slip mode. This achieves engine clutch slip control in all shift ranges including low-speed and medium-speed ranges and maintains the heat energy that is generated from the engine clutch at a predetermined level or lower.

In one aspect, the present disclosure provides a system for controlling engine clutch slip for a hybrid vehicle. The system includes a supply line for guiding oil to be supplied to an engine clutch, a circulation line for guiding oil discharged from the engine clutch, and a lubrication oil flow rate control valve mounted between the supply line and the circulation line so as to be connected thereto in order to control a lubrication oil flow rate. The system also includes a first ON/OFF solenoid valve connected to the lubrication oil flow rate control valve. The first ON/OFF solenoid valve receives line pressure applied thereto by operation of an electric oil pump. The system also includes a second ON/OFF solenoid valve connected to the lubrication oil flow rate control valve. The second ON/OFF solenoid valve receives line pressure applied thereto by operation of the electric oil pump.

In another aspect, the present disclosure provides a method for controlling engine clutch slip for a hybrid vehicle. The method includes determining whether an engine clutch is in a slip mode using a transmission control unit or a high-level control unit. Upon determining that the engine clutch is in the slip mode, the method includes controlling a second ON/OFF solenoid valve such that the second ON/OFF solenoid valve is switched ON irrespective of ON/OFF-operation of a first ON/OFF solenoid valve using the transmission control unit. The method also includes supplying oil for lubrication and cooling to the engine clutch using line pressure applied to the second ON/OFF solenoid valve in accordance with ON-operation of the second ON/OFF solenoid valve.

Other aspects and embodiments of the disclosure are discussed hereinbelow.

It is understood that the term "vehicle" or "vehicular" or other similar terms as used herein are inclusive of motor vehicles in general, such as passenger automobiles including sports utility vehicles (SUV), buses, trucks, various commercial vehicles, watercraft including a variety of boats and ships, aircraft, and the like. Such terms are also inclusive of hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example vehicles that are both gasoline-powered and electric-powered.

The above and other features of the disclosure are discussed hereinbelow.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus are not limitative of the present disclosure, and wherein.

Figure 1:
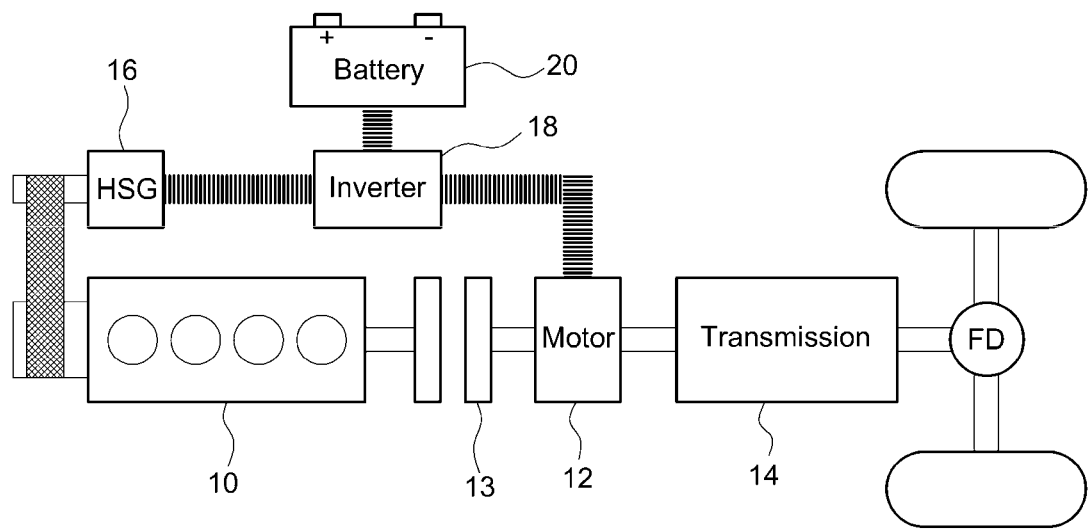
FIG. 1 is a power transmission system diagram of a hybrid vehicle.

It should be understood that the appended drawings are not necessarily to scale, presenting a somewhat simplified representation of various features illustrative of the basic principles of the disclosure. The specific design features of the present disclosure as described herein, including, for example, specific dimensions, orientations, locations, and shapes, are determined in part by the particular intended application and use environment.

In the figures, the same reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the disclosure is described in conjunction with specific embodiments, it will be understood that the present description is not intended to limit the disclosure to those disclosed embodiments. On the contrary, the disclosure is intended to cover not only the disclosed embodiments, but also various alternatives, modifications, equivalents and other embodiments, which may be included within the spirit and scope of the disclosure as defined by the appended claims.

The conventional configuration of a lubrication and cooling circuit for an engine clutch is first explained for better understanding of the disclosure.

Figure 2:
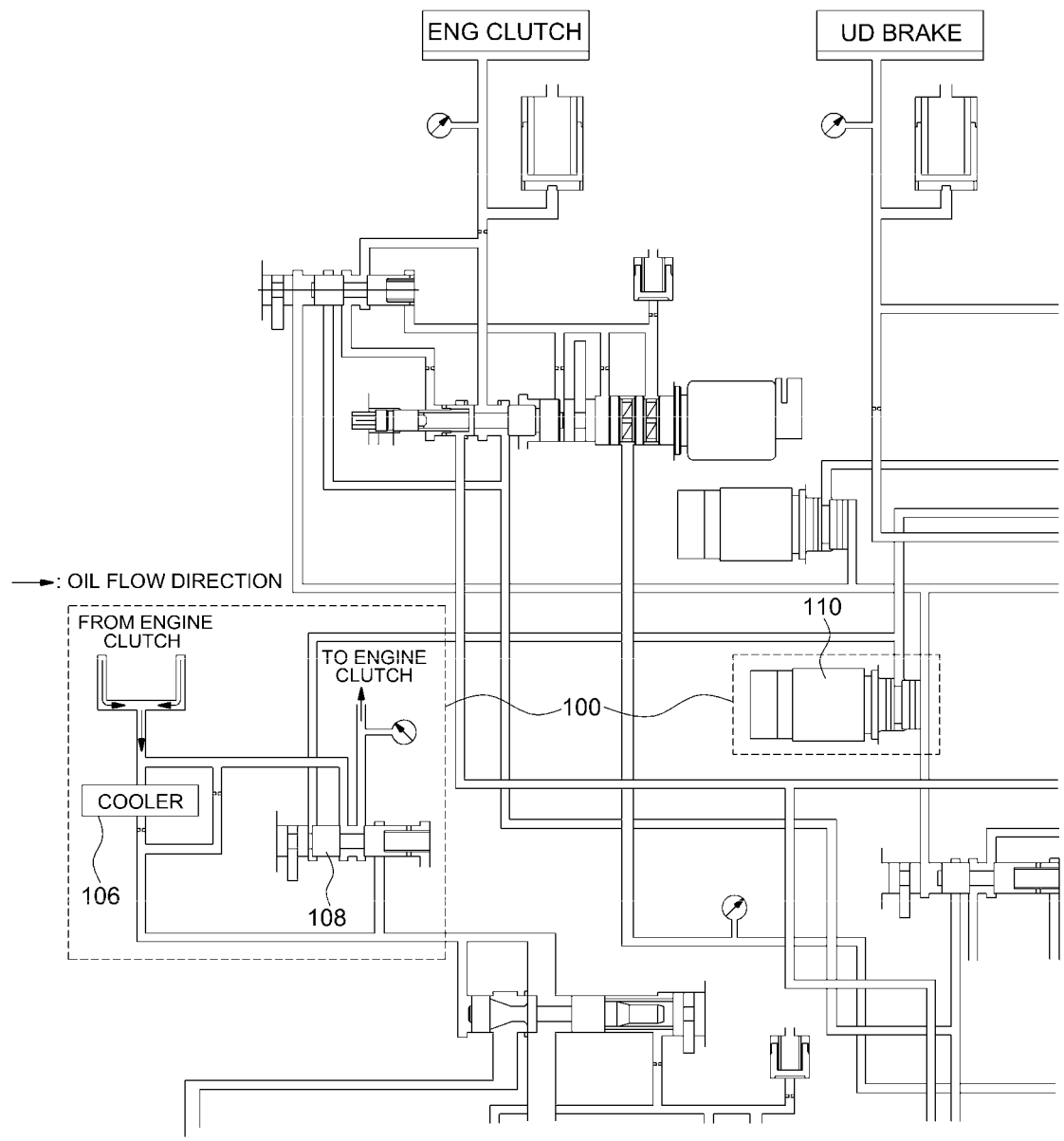
FIG. 2 is a hydraulic pressure circuit diagram showing a conventional lubrication and cooling circuit for an engine clutch.

FIG. 2 is a hydraulic pressure circuit diagram showing a conventional lubrication and cooling circuit for an engine clutch, in which reference numeral "100" refers to a lubrication unit for lubricating and cooling an engine clutch.

The lubrication unit 100 serves to supply lubrication oil to the engine clutch and to cool the oil having circulated through the engine clutch. The lubrication unit 100 includes a supply line 102, through which oil is supplied to the engine clutch, and a circulation line 104, through which the oil is discharged from the engine clutch.

In addition, a cooler 106 for cooling the oil is mounted in the circulation line 104. A lubrication oil flow rate control valve 108 for controlling the lubrication oil flow rate is mounted between the supply line 102 and the circulation line 104 so as to be connected thereto.

The lubrication oil flow rate control valve 108 is connected with a first ON/OFF solenoid valve 110, to which line pressure created by the operation of an electric oil pump is applied constantly or all of the time.

When the shift range is the D1 range, the parking range (the P range) or the neutral range (the N range), the first ON/OFF solenoid valve 110 is controlled so as to be switched ON by a transmission control unit. In the other shift ranges, the first ON/OFF solenoid valve 110 is controlled so as to be maintained in an OFF state without being switched ON by a fail-safe logic of the transmission control unit.

Therefore, when the first ON/OFF solenoid valve 110 is switched ON, the line pressure applied to the first ON/OFF solenoid valve 110 is directed to the lubrication oil flow rate control valve 108. Accordingly, the pressure of the oil that flows out of the circulation line 104 increases while the oil passes through the lubrication oil flow rate control valve 108. The oil with increased pressure is smoothly supplied to the engine clutch through the supply line 102, thereby achieving lubrication and cooling of the engine clutch.

However, because the first ON/OFF solenoid valve 110 is controlled so as to be switched ON by the transmission control unit only when the shift range is the D1 range, the parking range (the P range) or the neutral range (the N range), the lubrication of the engine clutch is enabled only when the shift range is the D1 range, the parking range (the P range) or the neutral range (the N range).

In contrast, when the first ON/OFF solenoid valve 110 is in the OFF state, only the oil having a low pressure, having passed through the circulation line 104, flows to the supply line 102 through the lubrication oil flow rate control valve 108. Therefore, the supply of oil to the engine clutch is not smoothly achieved. As a result, in shift ranges other than the D1 range, the parking range (the P range) and the neutral range (the N range), lubrication of the engine clutch is not achieved.

As such, in the prior art, because the engine clutch is lubricated only in some ranges (e.g. the D1 range) among all shift ranges, there is a limitation in performing engine clutch slip control in the low-speed and medium-speed ranges (the D2 range or higher), in which lubrication is not conducted. Thus, design freedom for improved drivability in the low-speed and medium-speed ranges is limited. There is also a difficulty in securing a margin for improving drivability during acceleration or deceleration of a vehicle.

In order to solve the above-described problems associated with the prior art, the present disclosure is characterized in that it is determined whether an engine clutch has entered a slip mode. An additional second ON/OFF solenoid valve, which is provided in a lubrication and cooling circuit, is controlled so as to be switched ON to increase the pressure of oil that is supplied to the engine clutch whenever the engine clutch enters the slip mode. This achieves lubrication of the engine clutch and the engine clutch slip control in all shift ranges including low-speed and medium-speed ranges.

Figure 3:
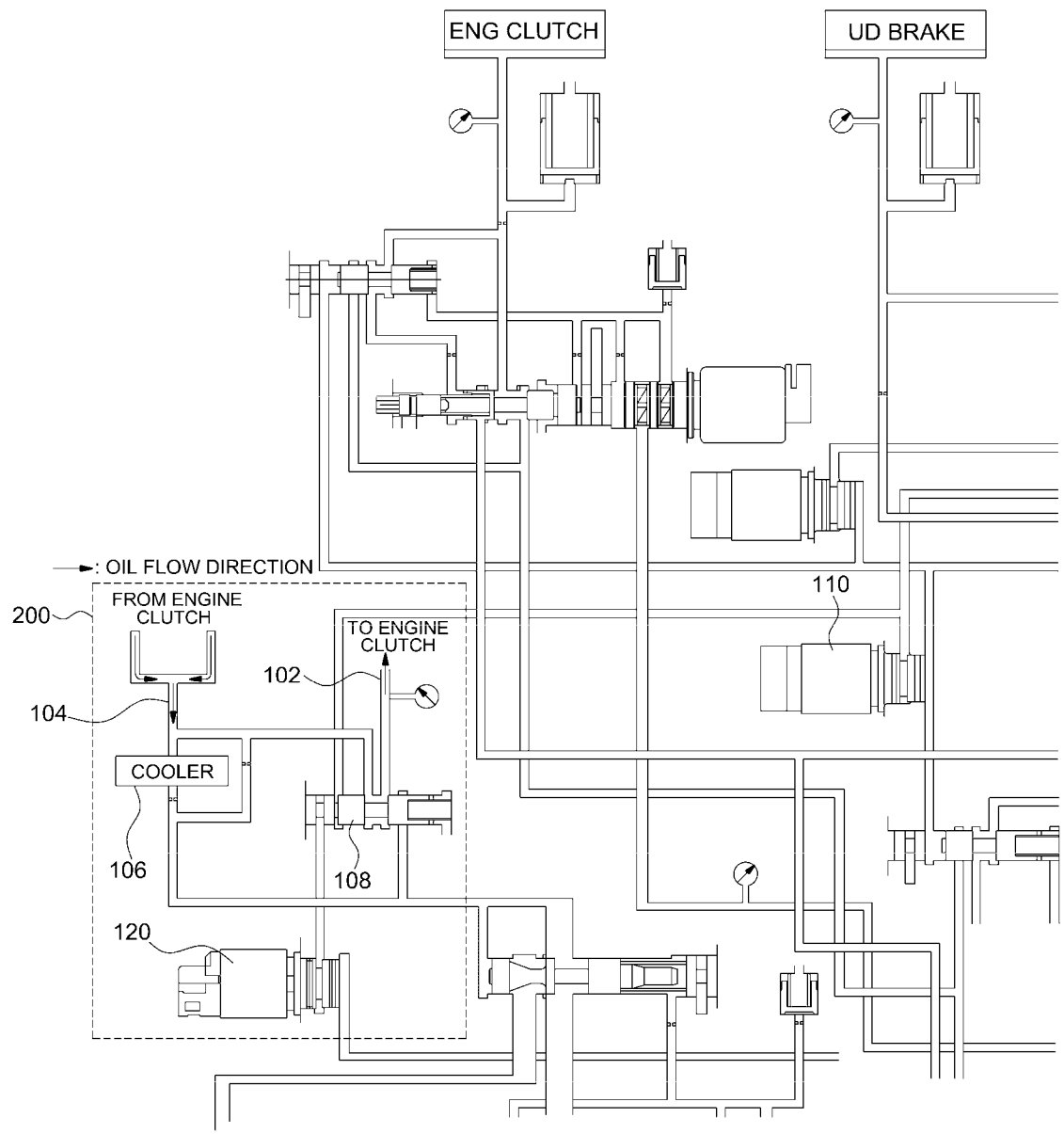
FIG. 3 is a hydraulic pressure circuit diagram showing a lubrication and cooling circuit for an engine clutch according to the present disclosure.

FIG. 3 is a hydraulic pressure circuit diagram showing a system for controlling engine clutch slip for a hybrid vehicle according to the present disclosure. In FIG. 3, reference numeral "200" refers to a lubrication unit of the present disclosure for lubricating and cooling an engine clutch.

The lubrication unit 200 serves to supply lubrication oil to the engine clutch and to cool the oil having circulated through the engine clutch. The lubrication unit 200 includes a supply line 102, through which oil is supplied to the engine clutch, and a circulation line 104, through which the oil is discharged from the engine clutch.

In addition, a cooler 106 for cooling the oil is mounted in the circulation line 104. A lubrication oil flow rate control valve 108 for controlling the lubrication oil flow rate is mounted between the supply line 102 and the circulation line 104 so as to be connected thereto.

The lubrication oil flow rate control valve 108 is connected with a second ON/OFF solenoid valve 120 as well as a first ON/OFF solenoid valve 110. The first ON/OFF solenoid valve 110 is the same as in the prior art. Line pressure created by the operation of an electric oil pump is also applied to the second ON/OFF solenoid valve 120 constantly or all of the time.

If the engine clutch slip conditions are satisfied, irrespective of the operation of the first ON/OFF solenoid valve 110, the second ON/OFF solenoid valve 120 is controlled so as to be switched ON by a transmission control unit. In contrast, when the engine clutch is not in the slip mode, the second ON/OFF solenoid valve 120 is maintained in the OFF state.

The first ON/OFF solenoid valve 110 may be controlled so as to be switched ON by the transmission control unit when the shift range is the D1 range, the parking range (the P range) or the neutral range (the N range). The second ON/OFF solenoid valve 120 may be controlled so as to be switched ON by the transmission control unit when the shift range is the D2 range or higher, other than the D1 range, the parking range (the P range) and the neutral range (the N range), and when the engine clutch slip conditions are satisfied simultaneously therewith.

Therefore, if it is determined that the engine clutch has entered the slip mode (i.e. the slip conditions are satisfied), the second ON/OFF solenoid valve 120 is controlled so as to be switched ON by the transmission control unit irrespective of the operation of the first ON/OFF solenoid valve 110.

Subsequently, as the second ON/OFF solenoid valve 120 is switched ON, the line pressure applied to the second ON/OFF solenoid valve 120 is directed to the lubrication oil flow rate control valve 108. Accordingly, the pressure of the oil that flows out of the circulation line 104 increases while the oil passes through the lubrication oil flow rate control valve 108. The oil with increased pressure is smoothly supplied to the engine clutch through the supply line 102, thereby achieving lubrication and cooling of the engine clutch.

When the current shift range is the D1 range, the parking range (the P range) or the neutral range (the N range), as described above, the oil for lubrication and cooling is easily supplied to the engine clutch by the ON-operation of the first ON/OFF solenoid valve 110. Therefore, when the current shift range is the D1 range, the parking range (the P range) or the neutral range (the N range), it is desirable to maintain the second ON/OFF solenoid valve 120 in the OFF state.

Of course, when the current shift range is the D1 range, the parking range (the P range) or the neutral range (the N range), the second ON/OFF solenoid valve 120 may also be switched ON simultaneously with the ON-operation of the first ON/OFF solenoid valve 110, thereby further increasing the pressure of the oil that is supplied to the engine clutch.

However, when the shift range is the D1 range, the P range or the N range, it is desirable to maintain the second ON/OFF solenoid valve in the OFF state. The reason for this is to decrease the drag of the engine clutch in an EV mode.

A method for controlling engine clutch slip according to the present disclosure based on the above-described configuration is now described.

Figure 4:
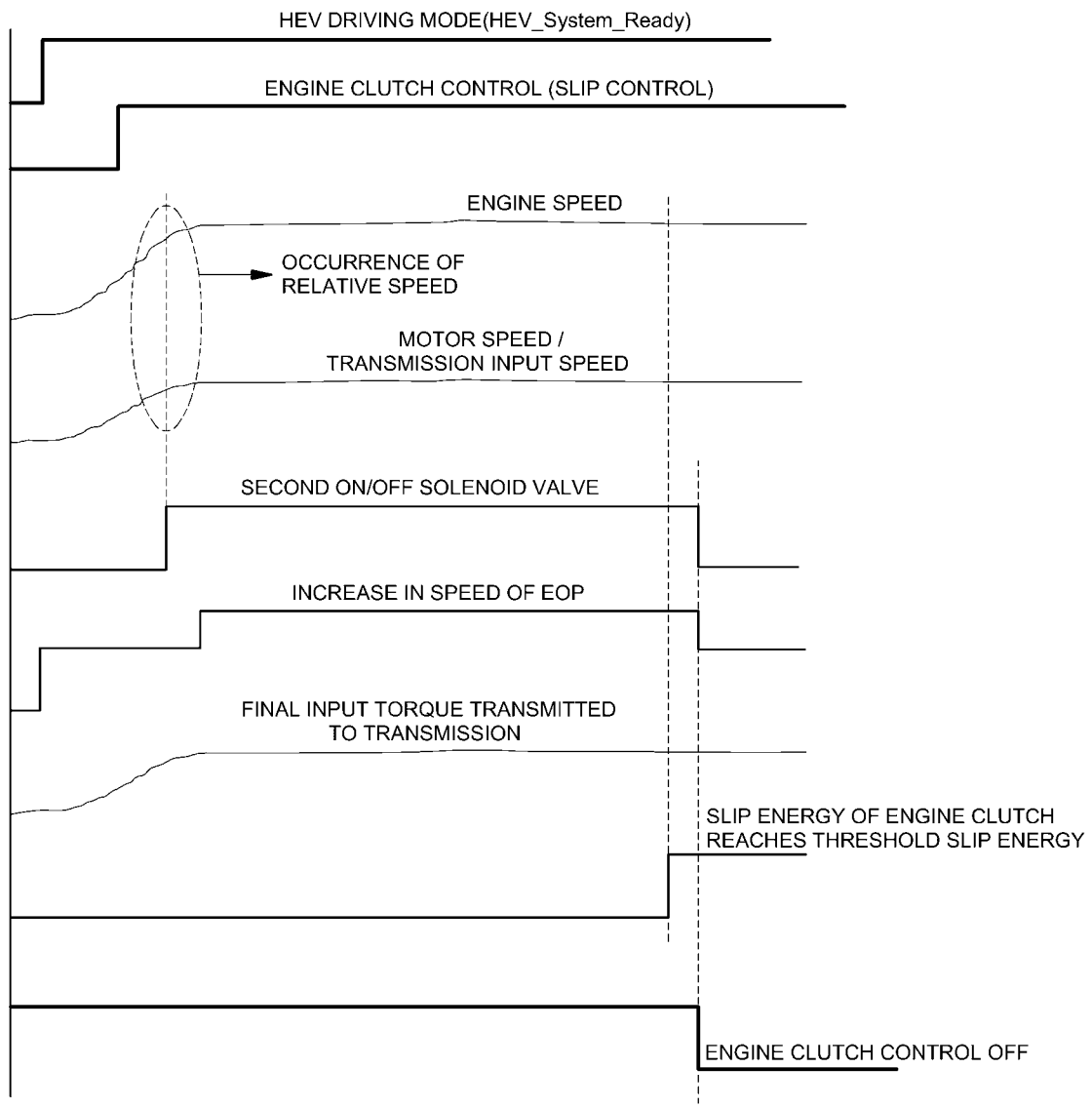
FIGS. 4 and 5 are a control diagram and a flowchart, respectively, explaining a system and method for controlling engine clutch slip according to the present disclosure.
Figure 5:
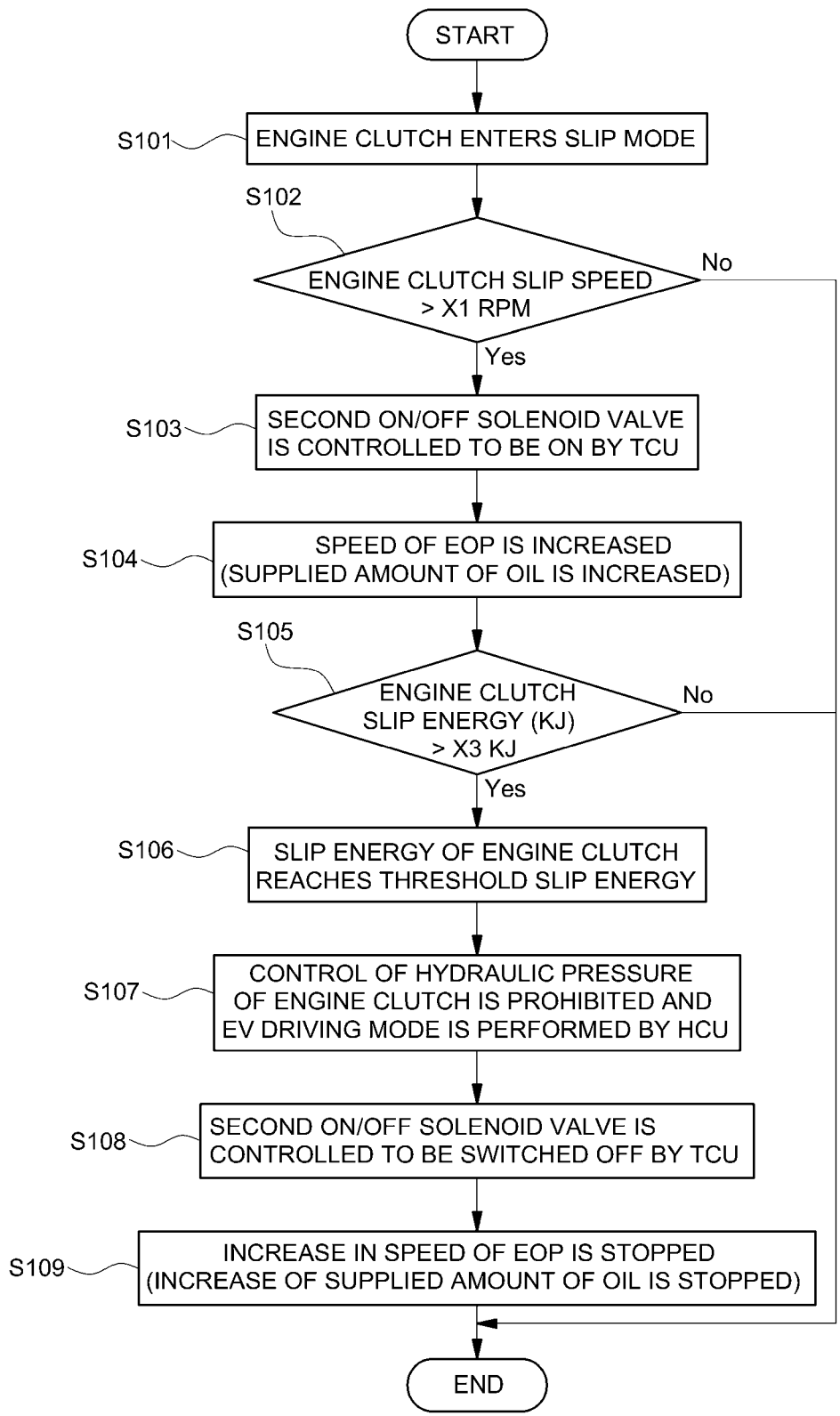

FIG. 4 is a control diagram showing a method for controlling engine clutch slip according to the present disclosure, and FIG. 5 is a flowchart thereof.

If the engine is driven while the vehicle is traveling, the transmission control unit or a high-level control unit determines whether the engine clutch slip conditions are satisfied, i.e., whether the engine clutch has entered the slip mode (operation or step S101).

At this time, whether the engine clutch slip conditions are satisfied, i.e., whether the engine clutch is in the slip mode, is determined based on the result of calculating the current slip speed (rpm) of the engine clutch. Upon determining that the calculated slip speed (rpm) of the engine clutch is equal to or greater than a predetermined speed X1 (rpm), the transmission control unit or the high-level control unit determines that the engine clutch is in the slip mode (operation or step S102).

The predetermined speed X1 (rpm) is set based on a difference in speed between the engine and the motor (the input shaft of the transmission) measured from the start of torque transmission from the engine clutch to the complete engagement of the engine clutch. The predetermined speed X1 may be set to about 50 rpm. If the calculated slip speed (rpm) of the engine clutch is equal to or greater than 50 rpm, it may be determined that the engine clutch is in the slip mode.

The slip speed of the engine clutch is calculated according to the gear ratio of each shift range. If the hydraulic pressure for operating the engine clutch is greater than a predetermined hydraulic pressure X0 (bar), the slip speed of the engine clutch may be calculated from the following equation 1.

$$\text{Engine Clutch Slip Speed} = |\text{Engine Speed} - \text{Transmission Input Shaft Speed (or Motor Speed)}| \quad \text{Equation 1}$$

If the current slip speed of the engine clutch, which is calculated from the above equation 1, is equal to or greater than the predetermined speed X1 (rpm), it is determined that the engine clutch is in the slip mode.

In contrast, if the hydraulic pressure for operating the engine clutch is not greater than the predetermined hydraulic pressure X0 (bar), the transmission control unit or the high-level control unit recognizes that the slip speed of the engine clutch is 0 rpm and determines that the engine clutch has not entered the slip mode.

The predetermined hydraulic pressure X0 (bar) is a factor based on whether the engine clutch is in the slip mode is determined, and refers to a hydraulic pressure for engaging the engine clutch, i.e., a kiss-point pressure at which the engine clutch starts to transmit torque. This predetermined hydraulic pressure may be calculated based on the area of a piston of the engine clutch, the elastic coefficient of a return spring, the stroke, the frictional coefficient, or the like.

Upon determining that the slip speed of the engine clutch exceeds the reference speed X1 (rpm) and that the engine clutch is in the slip mode, the transmission control unit (TCU) controls the second ON/OFF solenoid valve 120 such that the second ON/OFF solenoid valve 120 is switched ON irrespective of the operation of the first ON/OFF solenoid valve 110 (operation or step S103).

Subsequently, as the second ON/OFF solenoid valve 120 is switched ON, the line pressure applied to the second ON/OFF solenoid valve 120 is directed to the lubrication oil flow rate control valve 108. Accordingly, the pressure of the oil that flows out of the circulation line 104 increases while the oil passes through the lubrication oil flow rate control valve 108. The oil with increased pressure is smoothly supplied to the engine clutch through the supply line 102, thereby achieving lubrication and cooling of the engine clutch.

At this time, the electric oil pump (EOP) may be controlled such that the speed thereof increases (operation or step S104).

The line pressure is applied to the second ON/OFF solenoid valve 120 by the operation of the electric oil pump (EOP). Thus, if the speed of the electric oil pump (EOP) increases, the line pressure also increases. Accordingly, the pressure and amount of oil that is supplied to the engine clutch further increase.

Subsequently, the slip energy of the engine clutch is calculated and is compared with a predetermined energy X3 (kJ) (operation or step S105).

At this time, the slip energy of the engine clutch is calculated when the slip speed of the engine clutch is greater than the predetermined speed X1 (rpm), and is compared with the predetermined energy X3 (kJ).

If the slip energy of the engine clutch reaches a threshold slip energy, the heat energy emitted therefrom increases beyond a threshold value, which may lead to burning of the engine clutch. Therefore, the slip energy of the engine clutch is calculated in order to determine whether the slip energy of the engine clutch has reached the threshold slip energy.

When the slip speed of the engine clutch is greater than the predetermined speed X1 (rpm), the slip energy of the engine clutch is calculated from the following equation 2.

Engine Clutch Slip Energy $(n)$=Previous Engine Clutch Slip Energy $(n-1)$+(Slip Speed×Transmission Input Torque×0.1047×0.01s)   Equation 2

In equation 2, 0.1047×0.01 s is a factor for unit conversion (rpm→rad/s).

On the other hand, if the slip speed of the engine clutch is less than the predetermined speed X1 (rpm), the slip energy of the engine clutch is merely calculated from the following equation 3, but is not directly used to determine whether the slip energy of the engine clutch has reached the threshold slip energy.

Engine Clutch Slip Energy $(n)$=Previous Engine Clutch Slip Energy $(n-1)$−X2 (Cooling Factor) $[W]$×0.01s   Equation 3

When the engine clutch is not in the slip mode, the heat energy generated from the engine clutch gradually decreases, but the value thereof is maintained in the actual logic. Therefore, in equation 3, X2 (Cooling Factor) [W] is a value for compensating for the decreased amount of the slip energy, and is generally set to about 40 W. However, it may vary according to the specification of the clutch.

Subsequently, if the slip energy of the engine clutch calculated from the above equation 2 is greater than the predetermined energy X3 (kJ) according to the comparison result of the step S105, it is determined that the slip energy of the engine clutch has reached the threshold slip energy (operation or step S106).

When the slip energy of the engine clutch, calculated from the above equation 2, exceeds the predetermined energy X3 (kJ) and it is therefore determined that the slip energy of the engine clutch has reached the threshold slip energy, a message related thereto is output through an instrument cluster or the like, so that the driver may recognize the same.

The predetermined energy X3 (kJ) is set based on the maximum allowable capacity of the engine clutch. The maximum allowable capacity of the engine clutch is calculated based on the maximum transmittable torque and the characteristics of a friction material, but may be eventually set through testing.

Subsequently, upon determining that the slip energy of the engine clutch has reached the threshold slip energy, the high-level control unit prohibits the control of the hydraulic pressure of the engine clutch. For example, the control unit releases the hydraulic pressure applied for engagement of the engine clutch. Accordingly, the vehicle is switched to the EV driving mode (operation or step S107). This is a type of fail-safe function for preventing burning of the engine clutch due to an increase in the heat energy generated from the engine clutch beyond the threshold value and for preventing the occurrence of large shocks due to sudden engagement of the engine clutch when a fail occurs in the EV driving mode.

In addition, the second ON/OFF solenoid valve is switched OFF by the transmission control unit (operation or step S108). The control for increasing the speed of the electric oil pump (EOP) is also stopped (operation or step S109). The pressure and amount of the oil for lubrication and cooling that is supplied to the engine clutch are thus not further increased.

As is apparent from the above description, the present disclosure provides the following effects.

First, it is determined whether an engine clutch has entered a slip mode. An additional second ON/OFF solenoid valve, which is provided in a lubrication and cooling circuit, is controlled so as to be switched ON to increase the pressure of oil that is supplied to the engine clutch whenever the engine clutch enters the slip mode. This thereby easily achieves lubrication of the engine clutch and the engine clutch slip control in all shift ranges, including low-speed and medium-speed ranges. Accordingly, this improves the durability of the engine clutch.

Second, when the slip energy of the engine clutch reaches a threshold slip energy, the engagement of the engine clutch is released, and a vehicle is switched to an EV driving mode. This thereby prevents the engine clutch from being burned by an increase in the heat energy generated from the engine clutch.

The disclosure has been described in detail with reference to specific embodiments. However, it will be appreciated by those having ordinary skill in the art that changes may be made in these embodiments without departing from the principles and spirit of the disclosure, the scope of which is defined in the appended claims and their equivalents.

What is claimed is:

1. A system for controlling engine clutch slip for a hybrid vehicle, the system comprising:
    a supply line for guiding oil to be supplied to an engine clutch;
    a circulation line for guiding oil discharged from the engine clutch;
    a lubrication oil flow rate control valve mounted between the supply line and the circulation line so as to be connected thereto in order to control a lubrication oil flow rate;
    a first ON/OFF solenoid valve connected to the lubrication oil flow rate control valve, the first ON/OFF solenoid valve receiving line pressure applied thereto by operation of an electric oil pump; and
    a second ON/OFF solenoid valve connected to the lubrication oil flow rate control valve, the second ON/OFF solenoid valve receiving line pressure applied thereto by operation of the electric oil pump.

2. The system of claim 1, wherein when engine clutch slip conditions are satisfied, irrespective of ON-operation of the first ON/OFF solenoid valve, the second ON/OFF solenoid valve is controlled so as to be switched ON by a transmission control unit, and
    wherein when the engine clutch is not in a slip mode, the second ON/OFF solenoid valve is maintained in an OFF state.

3. The system of claim 1, wherein the first ON/OFF solenoid valve is controlled so as to be switched ON by a transmission control unit when a shift range is a D1 range, a parking range (a P range) or a neutral range (an N range), and the second ON/OFF solenoid valve is controlled so as to be switched ON by the transmission control unit when the shift range is a D2 range or higher and when engine clutch slip conditions are satisfied.

4. The system of claim 1, wherein when the first ON/OFF solenoid valve is switched ON, the second ON/OFF solenoid valve is also switched ON simultaneously therewith.

5. A method for controlling engine clutch slip for a hybrid vehicle, the method comprising:
    determining whether an engine clutch is in a slip mode using a transmission control unit or a high-level control unit;
    upon determining that the engine clutch is in the slip mode, controlling a second ON/OFF solenoid valve such that the second ON/OFF solenoid valve is switched ON irrespective of ON/OFF-operation of a first ON/OFF solenoid valve using the transmission control unit; and
    supplying oil for lubrication and cooling to the engine clutch using line pressure applied to the second ON/OFF solenoid valve in accordance with ON-operation of the second ON/OFF solenoid valve.

6. The method of claim 5, wherein the determining includes:
    calculating a current slip speed of the engine clutch; and
    when the calculated slip speed of the engine clutch is equal to or greater than a predetermined speed (rpm), determining that the engine clutch is in the slip mode.

7. The method of claim 6, wherein when a hydraulic pressure for operating the engine clutch is greater than a predetermined hydraulic pressure (bar), the slip speed of the engine clutch is calculated as follows:

$$\text{Engine Clutch Slip Speed} = |\text{Engine Speed} - \text{Transmission Input Shaft Speed (or Motor Speed)}|.$$

8. The method of claim 5, wherein, when the second ON/OFF solenoid valve is switched ON, the high-level control unit performs control of increasing a speed of an electric oil pump.

9. The method of claim 5, further comprising:
    after the supplying oil for lubrication and cooling to the engine clutch,
    calculating a slip energy of the engine clutch and comparing the slip energy of the engine clutch with a predetermined energy (kJ); and
    when the calculated slip energy of the engine clutch is greater than the predetermined energy (kJ), determining that the slip energy of the engine clutch has reached a threshold slip energy.

10. The method of claim 9, wherein when a slip speed of the engine clutch is greater than a predetermined speed (rpm), the slip energy of the engine clutch is calculated as follows:

$$\text{Engine Clutch Slip Energy }(n) = \text{Previous Engine Clutch Slip Energy }(n-1) + (\text{Slip Speed} \times \text{Transmission Input Torque} \times 0.1047 \times 0.01s).$$

11. The method of claim 9, wherein, upon determining that the slip energy of the engine clutch has reached the threshold slip energy beyond the predetermined energy (kJ), the high-level control unit prohibits control of a hydraulic pressure of the engine clutch and switches a driving mode of a vehicle to an electric-vehicle (EV) driving mode.

12. The method of claim 9, further comprising:
    upon determining that the slip energy of the engine clutch has reached the threshold slip energy beyond the predetermined energy (kJ), outputting a message related thereto through an instrument cluster so that a driver recognizes the message.

13. The method of claim 9, wherein upon determining that the slip energy of the engine clutch has reached the threshold slip energy beyond the predetermined energy (kJ), the transmission control unit controls the second ON/OFF solenoid valve such that the second ON/OFF solenoid valve is switched OFF, and stops control of increasing a speed of an electric oil pump.

* * * * *